United States Patent
Yageta et al.

(10) Patent No.: US 8,062,780 B2
(45) Date of Patent: Nov. 22, 2011

(54) FILM-COVERED ELECTRIC DEVICE AND METHOD OF MANUFACTURING SAME

(75) Inventors: Hiroshi Yageta, Kanagawa (JP);
Makihiro Otohata, Kanagawa (JP);
Masatomo Mizuta, Kanagawa (JP);
Takeshi Kanai, Kanagawa (JP)

(73) Assignees: NEC Corporation, Tokyo (JP); Fuji Jukogyo Kabushiki Kasha, Tokyo (JP)

( * ) Notice: Subject to any disclaimer, the term of this patent is extended or adjusted under 35 U.S.C. 154(b) by 1039 days.

(21) Appl. No.: 11/908,838

(22) PCT Filed: Mar. 10, 2006

(86) PCT No.: PCT/JP2006/304761
§ 371 (c)(1),
(2), (4) Date: Sep. 17, 2007

(87) PCT Pub. No.: WO2006/098242
PCT Pub. Date: Sep. 21, 2006

(65) Prior Publication Data
US 2009/0081542 A1    Mar. 26, 2009

(30) Foreign Application Priority Data
Mar. 17, 2005    (JP) ................................. 2005-077326

(51) Int. Cl.
*H01M 2/12* (2006.01)
(52) U.S. Cl. ........... 429/82; 57/59; 57/64; 57/72; 57/82; 57/83; 57/163; 57/174
(58) Field of Classification Search ............ 429/57, 429/59, 64, 72, 82, 83, 174, 163
See application file for complete search history.

(56) References Cited

U.S. PATENT DOCUMENTS

| 5,895,731 | A * | 4/1999 | Clingempeel .............. 429/162 |
| 2005/0158622 | A1* | 7/2005 | Mizuta et al. ............. 429/185 |
| 2008/0233468 | A1 | 9/2008 | Otohata et al. |

FOREIGN PATENT DOCUMENTS

| JP | 10-55792 | 2/1998 |
| JP | 11-86823 | 3/1999 |
| JP | 11-97070 | 4/1999 |
| JP | 2001-266814 | 9/2001 |
| JP | 2002-56835 | 2/2002 |
| JP | 2002-324526 | 11/2002 |
| JP | 2003-45380 | 2/2003 |
| JP | 2003-132868 | 5/2003 |
| JP | 2003-242952 | 8/2003 |
| JP | 2005-203262 | 7/2005 |
| JP | 2006-54099 | 2/2006 |

* cited by examiner

*Primary Examiner* — Keith Walker
*Assistant Examiner* — Ben Lewis
(74) *Attorney, Agent, or Firm* — Dickstein Shapiro LLP

(57) ABSTRACT

Battery element 2 is sandwiched between and surrounded by casing films 4, 5 each having a thermo-fusing resin layer, and is sealed by thermally fused region 6 formed by thermally fusing around the overall periphery. Cross-link structure portion 13 is formed in part of thermally fused region 6 by cross-linking casing film 5, and gas release chamber 12 is formed with its leading end positioned in cross-link structure portion 13. Gas release chamber 12 is a portion which is surrounded by thermally fused region 6 along its periphery, and in which casing films 4, 5 are not thermally fused. Tube 14 which is open at both ends is connected to gas release chamber 12, while sandwiched between casing films 4, 5, with its leading end positioned in gas release chamber 12.

15 Claims, 7 Drawing Sheets

FILM-COVERED ELECTRIC DEVICE AND METHOD OF MANUFACTURING SAME

TECHNICAL FIELD

The present invention relates to a film-covered electric device which has an electric device element such as a chemical battery element, a capacitive element and the like, represented by a chemical battery and a capacitor, sealed by a packing material made of a film, and a method of manufacturing the same.

BACKGROUND ART

One type of film-covered electric device is a film packed battery. Conventionally, there is known a film packed battery which includes a battery element sandwiched by casing films from both sides in its thickness direction, with the opposing casing films bonded to each other along the periphery of the battery element, to hermetically seal (hereinafter simply called "seal" as well) the battery element together with an electrolytic solution. A laminate film which has a laminate of a metal layer and a thermo-fusing resin layer is generally used for the casing films, and the casing films are bonded to each other by thermally fusing the thermo-fusing resin layers to each other.

Incidentally, when a voltage beyond a rated range is applied to a battery in use, gas species can generate within the battery due to electric decomposition of an electrolytic solvent. Further, when a battery is used at high temperatures beyond a rated range, materials which cause gas species are also generated due to decomposition of electrolyte salt and the like. Basically, it is ideal to use a battery within a rated range to prevent the generation of gases. However, if a control circuit of a battery does not normally operate for some reason to apply an abnormal voltage, or if the temperature abnormally rises around the battery for some reason, a large amount of gases can generate within the battery in some cases.

The generation of gases within a battery results in an increased pressure within the battery. In order to prevent a battery from bursting due to an extremely increased inner pressure, many of batteries which use a highly rigid packing material such as a metal can and a thick resin molding have a pressure safety valve for letting gases escape to the outside of the battery when the inner pressure of the battery increases. However, in film packed batteries which employ a film for a packing material, it is structurally difficult to provide a pressure safety valve. If the inner pressure extremely increases in a film packed battery, a space which contains a battery element swells, and the film is eventually burst, causing gases to blow out from the burst site. However, it is impossible to identify where the burst occurs. Therefore, the burst can adversely affect surrounding devices and members depending on the location at which the film is burst.

It is often the case that batteries are also used as energy sources for vehicles such as a car and a variety of machines, by way of example, or their-electric parts. Since gases generated from the interior of batteries can contain a combustible material and a corrosive material, importance should be placed on how to handle gases which blow out. JP2003-45380A (Patent Document 1) describes a car-mounted battery which includes a gas flow path within a battery box, where the gas flow path is coupled to an exhaust pipe through which gases generated within the battery box are discharged to the outside of a car.

JP2002-324526A (Patent Document 2) in turn describes a film packed battery which comprises a battery element sealed in layers by aluminum foil and covered with a plurality of covering materials, made of film, each having an opening. Each covering material is thermo-contractile, and covers the battery element such that their openings do not overlap with each other. According to the battery described in Patent Document 2, when gases are generated from the battery element, the aluminum foil breaks, causing the gases to blow out therefrom. The blowing gases sequentially pass through the openings of the respective covering materials from the inside to the outside, and are discharged to the outside of the battery. When the battery is heated, the respective covering materials contract such that the opening of the covering material on the inner side is sealed by the covering material on the outer side. In this way, external air including oxygen is prevented from flowing into the inside of the battery, thus preventing firing and the like of the battery.

Around a battery, there are often elements, such as terminals of the battery, a peripheral circuit connected to the terminals, contacts of the battery, and the like which, when applied with an electrolytic solution, give rise to troubles such as corrosion, malfunction and the like. Gases which blow out of the battery can contain a mist of electrolytic solution, so that in order to prevent troubles due to the blow-out of the gases, the gasses are preferably guided to and discharged from a location spaced away from those elements which can give rise to troubles, using a pipe, as described in Patent Document 1. In this event, the pipe must be hermetically connected to the packing material. As in Patent Document 1, in a car-mounted battery, the packing material is generally a highly strong member which itself has a sufficient thickness and rigidity. For such a member, it is easy to hermetically connect a pile thereto by employing an appropriate fitting structure, or adding a sealing member such as an O-ring.

However, a structure generally employed for film packed batteries to discharge internally generated gases from a particular site involves forming an area which has a lower bonding strength than the remaining area in a portion of a bonding region of a film which is a packing material, and discharging the gas from that area. Conventional film packed batteries give rise to the aforementioned troubles because there has only been proposed a structure for releasing gases immediately adjacent to the batteries. Thus, it is contemplated to connect a pipe to a film packed battery for guiding gases. However, a simply connected pipe results in difficulties in ensuring the sealability with a film because the pipe is connected to the film at a position from which gases are discharged, i.e., in a region which presents a low bonding strength. As a result, depending on a stress applied to the joint of the film with the pipe, the film peels off at the joint with the pipe to let gases leak, thus possibly failing to guide the gases to a desired position. On the other hand, in the film packed battery described in Patent Document 2, openings of the respective covering materials which cover the battery element in layers are simply shifted, without the need for forming an area with a lower bonding strength, so that a pipe can be hermetically connected to the outermost opening. However, since the film packed battery described in Patent Document 2 covers the battery element in layers, not only the amount of used covering materials extremely increases, as compared with ordinary film packed batteries, but also covering steps are also largely increased.

Such problems are common to film-covered electric devices which have electric device elements that can generate gases, sealed by casing films, not limited to the film packed battery.

DISCLOSURE OF THE INVENTION

It is an object of the present invention to provide a film-covered electric device which is capable of guiding internally generated gases to a desired position and releasing the gases therefrom in a simple structure, and to provide a method of manufacturing such a film-covered electric device as well.

To achieve the above object, a film-covered electric device of the present invention comprises an electric device element which internally accumulates electric energy and is capable of generating a gas through a chemical reaction or a physical reaction, and casing films for sealing the electric device element. The casing films each include a thermo-fusing resin layer, and surround the electric device element such that the thermo-fusing resin layers oppose each other along the periphery of the electric device element to seal the electric device element by a thermally fused region formed by thermally fusing the thermo-fusing resin layers opposing along the periphery to each other around the overall periphery of the electric device element. The film-covered electric device of the present invention further comprises a gas guide portion including a hollow portion independent of a space in which the electric device element is received, for leading the gas to a position spaced away from the electric device element, and communicating with external air, and a pressure release portion formed in part of the thermally fused region by connecting the space in which the electric device element is received to the hollow portion, for peeling off the casing films in preference to another region of the thermally fused region to allow the gas to pass therethrough.

In the film-covered electric device of the present invention configured as described above, as the inner pressure increases due to gases generated inside, a stress of peeling off the casing films acts on the inner edge of the thermally fused region of the casing films. The thermally fused region is partially formed with the pressure release portion connecting to the space in which the electric device element is received. Since the pressure release portion peels off in preference to the other thermally fused region, the casing films peel off progressively in the pressure release portion in preference to the other region. The gas guide portion is connected to the pressure release portion, and as the casing films peel off up to the gas guide portion in the pressure release portion, the space in which the electric device element is received communicates with the hollow portion of the gas guide portion, to release gases from the leading end of the gas guide portion. In this way, according to the film-covered electric device of the present invention, internally generated gases are released from a desired position.

For arbitrarily setting a gas release position, the gas guide portion preferably includes a tube. The tube can be made, for example, of a resin of the same type as the resin which comprises the thermo-fusing resin layers of the casing films at least in the outer peripheral surface of a joint with the casing films. The pressure release portion can employ a variety of structures as long as it has a structure which reduces a peeling strength as compared with the other region of the thermally fused region. For example, such a structure may include a cross-link structure portion made of a cross-linked resin, a protrusive fused portion formed to protrude toward the space in which the electric device element is received, and a laminar member sandwiched by the casing films opposing each other, made of a resin exhibiting a higher melting point than the thermo-fusing resin which comprises the thermo-fusing resin layer, and impregnated with the thermo-fusing resin.

Further, in one configuration, a tube having one closed end and formed with a throughhole through a side surface thereof may expose the one closed end to the space in which the electric device element is received between the casing films opposing each other, close the throughhole from the outside, and be thermally fused with a smaller peeling strength as compared with other regions of the thermally fused region. In this configuration, the tube serves both as the gas guide portion comprising the hollow portion, and the pressure release portion.

A method of manufacturing a film-covered electric device of the present invention comprises the steps of providing an electric device element which internally accumulates electric energy and is capable of generating a gas through a chemical reaction or a physical reaction, and casing films each including a thermo-fusing resin layer, for sealing the electric device element, surrounding the electric device element such that the thermo-fusing resin layers oppose each other along the periphery of the electric device element, and sealing the electric device element by thermally fusing the casing films surrounding the electric device element along the overall periphery of the electric device element. The step of sealing the electric device element thermally fuses the casing films, where the film packed battery comprises a gas guide portion including a hollow portion independent of a space in which the electric device element is received, for leading the gas to a position spaced away from the electric device element, and communicating with external air, and a pressure release portion for connecting the space to the hollow portion in part of the thermally fused region, for peeling off in preference to another region of the thermally fused region to allow the gas to pass therethrough.

The film-covered electric device of the present invention described above is manufactured by the method of manufacturing a film-covered electric device of the present invention.

According to the present invention, the casing films can be forced to peel off, due to a rise in the inner pressure resulting from gases generated inside, in the pressure release portion without fail, to release the internally generated gases from the gas guide portion. Since the gas guide portion is configured to lead gases to a position spaced away from the electric device element and communicate with external air, the gases can be led to a position at which gases, if released, will not exert influences. Moreover, since the pressure release portion and gas guide portion alone are required, the film-covered electric device can be simplified in configuration as a whole, and the film-covered electric device can also be readily manufactured.

Figure 1:
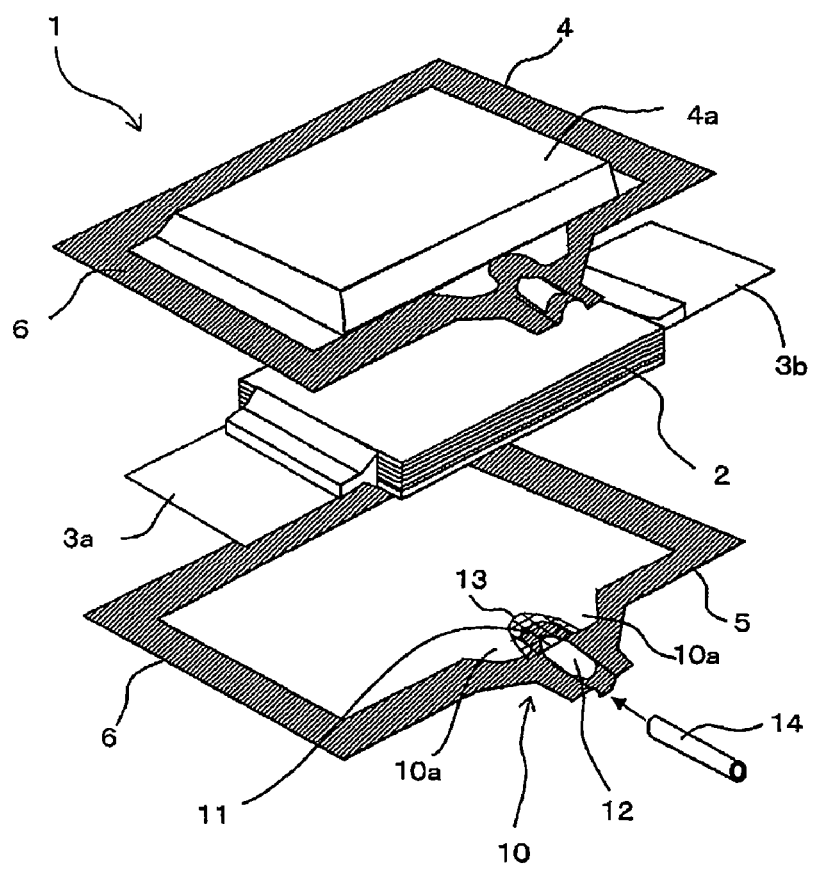
FIG. 1 An exploded perspective view of a film packed battery according to a first embodiment of the present invention.

DESCRIPTION OF REFERENCE NUMERALS 1. 31 Film Packed Batteries
2, 32 Battery Elements
3a Positive Tab
3b Negative Tab
4, 5, 34, 35, 54, 55 Casing films
6, 36, 56 Thermally fused regions
8, 38 Thermo-fusing resin Layers
9 Non-Ventilation Layer
10 Pressure Release Portion
10a Non-Fusion Portion
11 Protruding Fusion Portion
12 Gas Release Chamber
13 Cross-Link Structure Portion
14, 44, 64 Tubes
21 Resin Sheet
23 Unwoven Fabric
44a Throughhole
45 Metal Adhesive Resin
66 Protection Member
76, 86 Members

BEST MODE FOR CARRYING OUT THE INVENTION

First Embodiment

Figure 2:
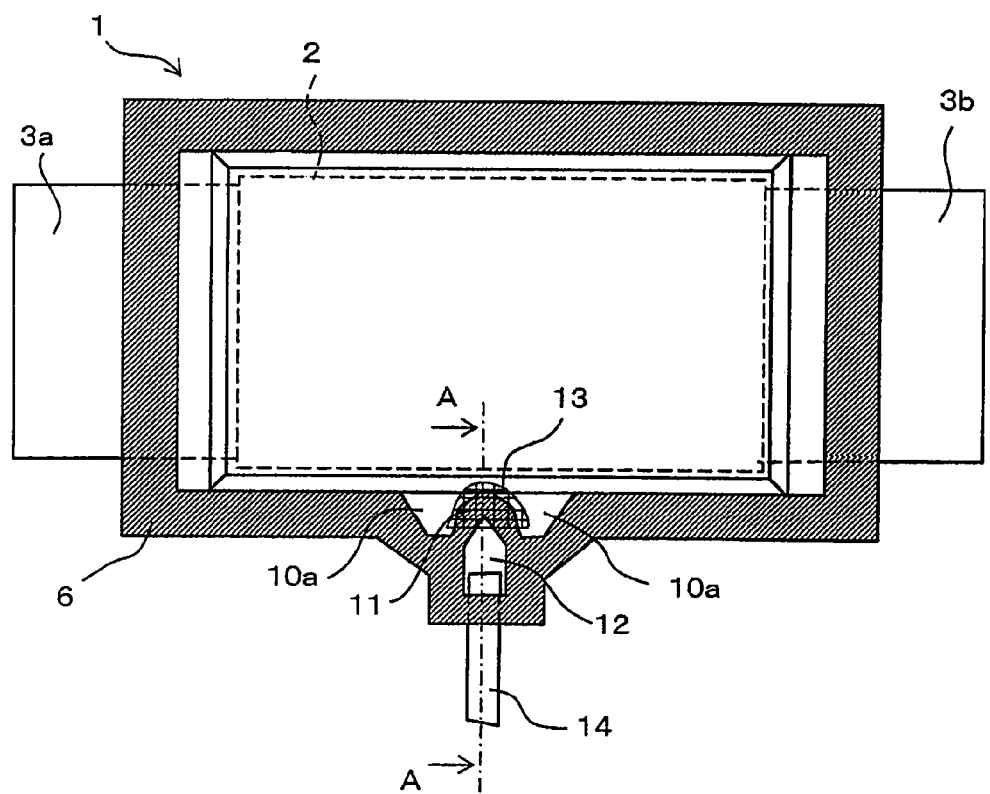
FIG. 2 A plan view of the film packed battery illustrated in FIG. 1.
Figure 3:
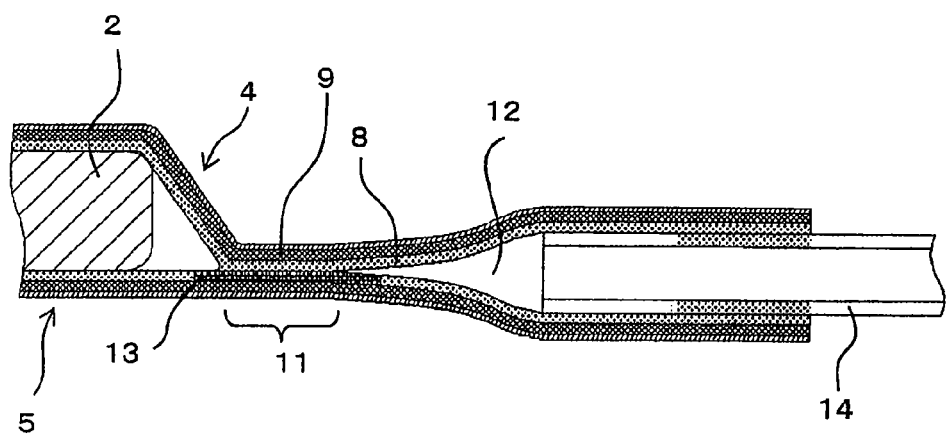
FIG. 3 A cross-sectional view taken along A-A line in FIG. 2.

Referring to FIGS. 1 to 3, film packed battery 1 of this embodiment comprises flat substantially rectangular solid battery element 2 which has a plurality of positive plates and a plurality of negative plates in a laminated structure, positive tab 3a and negative tab 3b connected to the positive plates and negative plates of battery element 2, respectively, and two casing films 4, 5 for sealing battery element 2.

Battery element 2 has a structure in which a plurality of positive plates and a plurality of negative plates, each of which is made of metal foil coated with an electrode material on both sides, are alternately laminated through separators. An uncoated portion, which is not coated with the electrode material, is protrusively provided from one side of each positive plate and each negative plate. The uncoated portions of the positive plates, and the uncoated portions of the negative plates are collectively ultrasonic welded to each other, and connected to positive tab 3a and negative tab 3b, respectively. The ultrasonic welded uncoated portions of the positive tab and negative tab are called charge collectors. In other words, positive tab 3a and negative tab 3b are connected to the charge collectors on the positive side and negative side of battery element 2, respectively.

In this embodiment, the positive plates and negative plates are stacked with their electrode material uncoated portions being protruded in opposite directions to each other. Therefore, positive tab 3a and negative tab 3b are drawn out from mutually opposite sides of film packed battery 1. In this embodiment, film packed battery 1 is designed to have a substantially rectangular plane shape, and positive tab 3a and negative tab 3b are drawn out from short sides of the rectangle.

With a nonaqueous electrolytic battery such as a lithium ion battery, aluminum foil is generally employed for metal foil by which positive plates are made, while copper foil is employed for metal foil by which negative plates are made. Further, an aluminum plate is employed for positive tab 3a, while a nickel plate or a copper plate is employed for negative tab 3b. When negative tab 3b is made of a copper plate, nickel may be plated on the surface thereof.

The separators may employ a laminar member which can be impregnated with an electrolytic solution, such as a microporous film, an unwoven fabric, a woven fabric and the like made of a thermoplastic resin such as polyolefin or the like.

Casing films 4, 5 have plane dimensions larger than plane dimensions of battery element 2 because they surround battery element 2 from both sides in its thickness direction. Battery element 2 is sealed by thermally fusing opposing surfaces of casing films 4, 5, which overlap with each other around battery element 2. Therefore, the periphery of battery element 2 is a sealed region around the whole periphery, where the thermally fused regions are particularly indicated by shading as thermally fused regions 6 in the drawings. One casing film 4 includes cup portion 4a in a central region in order to form a battery element receiving recess which is a space for surrounding battery element 2. Thermally fused region 6 is formed around the overall periphery of this cup portion 4a. Cup portion 4a can be processed by deep-drawing. While cup portion 4a is formed in only one casing film 4 in this embodiment, cup portions may be formed in both casing films 4, 5. Alternatively, battery element 2 may be surrounded by taking advantage of the flexibility of casing films 4, 5 without forming the cup portion.

A laminate film is preferably used for casing film 4, 5. The laminate film available therefor is flexible and is capable of sealing battery element 2 through thermally fusing such that an electrolytic solution does not leak. Representative examples of laminate films available for casing films 4, 5 include a structure which comprises non-ventilation layer 9 made of a metal thin film or the like laminated with thermo-fusing resin layer 8 made of a thermo-fusing resin, or a structure which further comprises a protective layer made of a film such as polyester, like polyethylene telephthalate or the like, nylon or the like, laminated on a surface of non-ventilation layer 9 opposite to thermo-fusing resin layer 8. When battery element 2 is sealed, thermo-fusing resin layers 8 are opposed each other to surround battery element 2.

A metal thin film available for making non-ventilation layer 9 may be foil of Al, Ti, Ti alloy, Fe, stainless steel, Mg alloy and the like, which has a thickness of, for example, 10-100 μm. For the thermo-fusing resin preferably used for thermo-fusing resin layer 8, though described later, the thickness of thermo-fusing resin layer 8 is preferably from 10 to 200 μm, and more preferably from 30 to 100 μm in order to perform satisfactory thermally fusing.

Further, film packed battery 1 of this embodiment comprises pressure release portion 10, and a gas guide portion. Pressure release portion 10 releases internally generated gases to the outside before film packed battery 1 explodes when the inner pressure of film packed battery 1 increases due to the gases. The gas guide portion guides the gases released through pressure release portion 10 to the outside of film packed battery 1.

Pressure release portion 10 is defined in the middle of a long side of film packed battery 1 as part of thermally fused region 6 in this embodiment, and comprises protrusive fused portion 11 formed by extending part of the inner edge of thermally fused region 6 toward battery element 2, and cross-link structure portion 13 formed in a range including protrusive fused portion 11. The gas guide portion comprises gas release chamber 12 formed with its periphery surrounded by thermally fused region 6 such that its leading end is positioned at protrusive fused portion 11, and tube 14, which is open at both ends, hermetically connected to gas release chamber 12, with one end open to gas release chamber 12 and the other end open to the outside of film packed battery 1. In other words, the gas guide portion is disposed independently of the battery element receiving recess, and comprises gas release chamber 12 and tube 14 which are open at positions spaced away from casing films 4, 5 and communicate with external air. Also, pressure release portion 10 is formed by joining the battery element receiving recess and gas release chamber 12 to part of thermally fused region 6.

Gas release chamber 12 is formed as a region between casing films 4, 5, in which casing films 4, 5 simply oppose each other, i.e., casing films 4, 5 are not thermally fused, and thereby gas release chamber 12 communicates with external air through tube 14. Also, gas release chamber 12 is isolated from the battery element receiving recess by thermally fused region 6, and does not communicate with the battery element receiving recess.

Tube 14 leads gases generated within film packed battery 1 to a location where even if the gases are released, no influence is exerted thereby. For this purpose, though tube 14 is represented in a linear fashion by a relatively short length, tube 14 has an appropriate length, and is routed as appropriate, such that the other end which is open to the outside of film packed battery 1 is positioned at a location which is not affected by the gases even if they are released.

Tube 14 is sandwiched and held by casing films 4, 5, and has its overall outer peripheral surface hermetically bonded to casing films 4, 5 between casing films 4, 5. While FIG. 1 shows tube 14 which is substantially circular in cross section, the shape of tube 14 is arbitrary as long as it can be hermetically connected between casing films 4, 5. Also, for making a more secure hermetic connection of casing films 4, 5 to tube 14, casing films 4, 5 may be previously processed into a shape conforming to the outer shape of tube 14 in portions to which tube 14 is connected, as illustrated in FIG. 1. This processing can be performed in a manner similar to the processing of cup portion 4*a*.

One of casing films 4, 5 (casing film 5 which is not formed with the cup portion in this embodiment) is partially formed with cross-link structure portion 13 by selectively cross-linking thermo-fusing resin layer 8. Cross-link structure portion 13 is formed at least in a region including protrusive fused portion 11. Therefore, cross-link structure portion 13 is formed as a single continuous area formed on one of mutually opposing surfaces, when battery element 2 is surrounded, with one site exposing to the battery element receiving recess and another site exposing gas release chamber 12. Also, since cross-link structure portion 13 is formed only in one casing film 5, thermo-fusing resin layer 8 which is not cross-linked with casing film 4 is thermally fused with cross-link structure portion 13 of the other casing film 5 in protrusive fused portion 11.

While cross-link structure portion 13 cannot be viewed from the outside of actual film packed battery 1, FIG. 2 represents cross-link structure portion 13 as indicative of its position. This applies to plan views of film packed batteries which illustrate subsequent embodiments.

Cross-link structure portion 13 can be formed by irradiating thermo-fusing resin layer 8 with an electron beam. While the thermo-fusing resin may be cross-linked by a method of adding a cross-link agent to a resin, the electron beam can be utilized to selectively form cross-link structure portion 13 at a particular position simply using a mask for shielding the electron beam.

In this way, since cross-link structure portion 13 is formed by irradiating thermo-fusing resin layer 8 with an electron beam, a thermo-fusing resin available for forming thermo-fusing resin layer 8 may be a resin composition which is capable of thermally fusing and can form cross-link structure portion 13 with an electron beam irradiated thereto. As long as such a resin composition is concerned, a simple resin, a mixture of a plurality of kinds of resins, or even an electron beam decomposition type resin which contains a resin composition with an electron beam reactive compound added thereto (including mixed therewith, coated therewith, and the like, which is applied to the following) can be employed.

Such resin compositions may include polyolefin homo polymer such as polyethylene (high, middle, low density polyethylene, straight chain low-density polyethylene), polypropylene and the like; polyolefin copolymers such as propylene-ethylene copolymer, a copolymer of propylene and/or ethylene with α-olefine such as and butene-1 or the like; and resins having a repeated unit, —($CH_2$—CHX)— (where X is a substituent group such as H, $CH_3$ and the like), such as modified polyolefin and the like, such as ethylene-vinyl acetate copolymer (EVA), ethylene-ethylacrylate copolymer (EEA), ethylene-methylacrylate copolymer (EMA), ethylene-glycidymethacrylate copolymer (EGMA) and the like.

Also, even electron beam decomposition type resins such as polyisobtylene, polymethacrylate, polyvinylidene fluoride and the like can be used as resins for comprising thermo-fusing resin layer 8, provided that an electron beam reactive compound is added thereto, as shown below.

While the electron beam reactive compound is not limited as long as the compound reacts with an electron beam irradiated thereto, one which is multifunctional and is capable of forming a cross-link structure is preferred. For example, multifunctional acrylic-based compounds such as triethylene glycol (meta) acrylate, trimethylol propane tri(meta)acrylate, pentaerythritol tetraacrylate, dipentaerythritol hexaacrylate, pentaerythritol triacrylate hexamethylene diisociante urethane polymer and the like; monofunctional acrylic based compounds such as methyl (meta)acrylate, metoxypolyethylene glycol (meta) acrylate and the like; mixtures of multifunctional acrylic based compounds with monofunctional acrylic based compounds; cycloaliphatic epoxy compounds such as 3,4-epoxy cyclohexylmethyl-3',4'-epoxy cyclohexane carboxylate, 1,4-(6-methyl-3,4-epoxy cyclohexyl methylcarboxylate) butane, and the like; vinyl compounds such as vinylpyrrolidone, vinyl acetate, vinylpyridine, styrene, and the like; and so forth can be used. These electron beam reactive compounds may be mixed into overall thermo-fusing resin layer 8, or may be coated on the surface thereof.

The irradiation of thermo-fusing resin layer 8 with an electron beam is performed only for casing film 5, while regions not formed with cross-link structure portion 13 are masked with an electron beam shielding member, before a step of sealing battery element 2, specifically, before battery element 2 is surrounded by casing films 4, 5. An arbitrary material can be used for the electron beam shielding member, as long as it can prevent the electron beam from being irradiated to regions which are not formed with cross-link structure portion 13, for example, a metal material such as aluminum, iron, lead, titanium, copper or the like, or a glass material. Among others, a metal material such as aluminum, iron and the like is preferred from a viewpoint of the ease of processing or molding into a desired shape.

Film packed battery 1 of this embodiment can be manufactured, for example, in the following manner.

First, one casing film 5 of two casing films 4, 5 is irradiated with an electron beam to a predetermined region in a manner described above to form cross-link structure portion 13.

Next, previously provided battery element 2, to which positive tab 3a and negative tab 3b are connected, is sandwiched between and surrounded by the aforementioned casing films 4, 5. In this event, casing films 4, 5 are oriented such that thermo-fusing resins 8 oppose each other. Subsequently, opposing regions of casing films 4, 5 around battery element 2 are applied with pressure and heat by a thermally fusing head (not shown) to form thermally fused region 6, thereby sealing battery element 2. If a thermally fusing head used for the thermally fusing has a pressure applying surface corresponding to the shape of thermally fused region 6, no special step is required for forming protrusive fused portion 11 and gas release chamber 12. Also, casing films 4, 5 are positioned relative to thermally fusing head such that a position at which protrusive fused portion 11 is formed matches with the position of cross-link structure portion 13 of casing film 5.

Battery element 2 can be sealed, for example, by previously thermally fusing three sides of casing films 4, 5 collectively or on a side-by-side basis to form casing films 4, 5 into a bag which has one open side, pouring an electrolytic solution from the remaining open side of bag-shaped casing films 4, 5, and subsequently thermally fusing the remaining one side. Also, when the remaining one side is thermally fused in a decompressed atmosphere (within a decompressed chamber), casing films 4, 5 are pressed against battery element 2 by the atmospheric pressure, when sealed film packed battery 1 is returned to the atmospheric pressure, thus making it possible to bring casing films 4, 5 into close contact with battery element 2.

Tube 14 can be connected to casing films 4, 5 during the step of sealing battery element 2, or after the sealing. Tube 14 is connected to casing films 4, 5 by a method not particularly limited, as long as the method can hermetically bond tube 14 with casing films 4, 5 around the entire periphery of tube 14, and can be connected with an adhesive, or can be connected through thermally fusing.

When tube 14 is made of a thermo-fusing resin, a thermally fusing based connection method is preferably used. For example, for thermally fusing a side provided with pressure release portion 10, casing films 4, 5 are thermally fused while leaving an opening for inserting tube 14 thereinto. When the side provided with pressure release portion 10 is the last side, battery element 2 is sealed at this time. Next, one end of tube 14 is inserted into gas release chamber 12 from the opening, and in this state, casing films 4, 5 are thermally fused on the outer peripheral surface of tube 14. Alternatively, upon thermally fusing the side provided with pressure release portion 10, tube 14 has been fixed at a predetermined position sandwiched by casing films 4, 5, such that tube 14 can be thermally fused simultaneously with the thermally fusing of casing films 4, 5.

When tube 14 is connected through thermally fusing, the outer peripheral surface of at least the joint of tube 14 with casing films 4, 5 is preferably made of the same type of resin as the resin which comprises thermo-fusing resin layers 8 of casing films 4, 5 in order to more ensure the sealability of the outer peripheral surface of tube 14 with casing films 4, 5. For example, thermo-fusing resin layer 8 is made of polypropylene, the outer peripheral surface of tube 14 is also made of polypropylene.

According to film packed battery 1 configured as described above, when gases are generated from battery element 2 due to the application of a voltage out of a rated range or a temporary rise in temperature during use, the inner pressure of film packed battery 1 increases. As the inner pressure increases, the battery element receiving recess, which is a space for surrounding battery element 2 within casing films 4, 5, tends to swell in a dome shape, causing a stress of peeling off casing films 4, 5 to act on the inner edge of thermally fused region 6.

Since thermally fused region 6 is formed with the aforementioned protrusive fused portion 11, the peel-off stress concentrates on this protrusive fused portion 11, so that the casing films 4, 5 are progressively peeled off preferentially in protrusive fused portion 11. In this event, since one casing film 5 is formed with cross-link structure portion 13 in protrusive fused portion 11, casing films 4, 5 seal on the interface of both with certainty. As the peeling progresses on the interface of casing films 4, 5 to reach gas release chamber 12, the battery element receiving recess communicates with gas release chamber 12.

As the battery element receiving recess communicates with gas release chamber 12, gases within the battery receiving recess are introduced into gas release chamber 12, and further pass through tube 14 from gas release chamber 12, and are released from the leading end of tube 14. In this way, since cross-link structure portion 13 defines the interface on which casing films 4, 5 peel off, a gas release pressure is stable, thus providing highly reliable film packed battery 1 in a simple structure, which ensures that casing films 4, 5 are peeled off up to gas release chamber 12.

The following description will be given of the action of protrusive fused portion 11, cross-link structure portion 13, and tube 14 in order.

First, protrusive fused portion 11 is described.

Protrusive fused portion 11 is formed as part of thermally fused region 6 protruding toward battery element 2 relative to the surroundings. In other words, both sides of protrusive fused portion 11 are non-sealed portions 10a continuous to the battery element receiving recess. As gases are generated within the battery element receiving recess, the generated gases are filled not only in the battery element receiving recess but also in non-sealed portions 10a on both sides of protrusive fused portion 11. In this way, protrusive fused portion 11 is applied, at its leading end, not only with the stress of peeling off casing films 4, 5 which acts in a direction toward the proximal end of protrusive fused portion, but also with peel-off stresses from both sides in a direction perpendicular to the tangent of protrusive fused portion 11. Thus, protrusive fused portion 11 is applied with a larger peel-off stress than other sites as a resultant force of these peel-off stresses, with the result that casing films 4, 5 are increasingly peeled off in preference to other sites.

Incidentally, when protrusive fused portion 11 is simply added to a long side of film packed battery 1, thermally fused region 6 must be retracted relative to battery element 2 along the side on which protrusive fused portion 11 is provided, resulting in larger outside dimensions of film packed battery 1. Accordingly, in this embodiment, casing films 4, 5 are formed into a partially outwardly extending shape, and thermally fused portion 6 is formed so as to form cove-shaped regions continuous to the battery element receiving recess in the extending portions, and protrusive fused portion 11 is formed in the cove-shaped regions. As a result, both sides of protrusive fused portion 11 of the cove-shaped regions are formed as no-sealed portions 10a in which casing films 4, 5 are not thermally fused. By thus forming protrusive fused portion 11, protrusive fused portion 11 can be formed to have a function as a portion which bears the stress of peeling off casing films 4, 5, concentrating thereon, from the inside of the battery element receiving recess, while minimizing an increase in the outside dimension of film packed battery 1.

Protrusive fused portion 11 is not limited in shape to that having an arcuate leading end as illustrated in FIG. 1 and the like, but may be in any shape such as rectangular shape, tapered shape and the like, as long as it substantially protrudes toward battery element 2.

Next, cross-link structure portion 13 is described.

As illustrated in FIG. 3, in protrusive fused portion 11, cross-link structure portion 13 of casing film 5 is thermally fused with thermo-fusing resin layer 8 of casing film 4. Cross-link structure portion 13 is less prone to softening at high temperatures, as compared with thermo-fusing resin layer 8, so that even if they are thermally fused, cross-link structure portion 13 and thermo-fusing resin layer 8 are not completely integrated, but a boundary exists between cross-link structure portion 13 and thermo-fusing resin layer 8. Here, "less prone to softening at high temperatures" means that in the temperature—strain characteristic, a so-called creep curve, for example, when a resin is heated while it is applied with a constant stress, the inclination of the creep curve becomes smaller when the horizontal axis represents the temperature.

Since cross-link structure portion 13 is thermally fused with thermo-fusing resin layer 8 in the structure of protrusive fused portion 11, casing films 4, 5 are peeled off progressively along the boundary between cross-link structure portion 13 of casing film 5 and thermo-fusing resin layer 8 of casing film 4. As they are progressively peeled off, casing films 4, 5 are separated on the boundary between thermo-fusing resin layer 8 in which casing film 4 is not cross-linked and cross-link structure portion 13 of casing film 5 in protrusive fused portion 11, causing the battery element receiving recess to communicate with gas release chamber 12. In other words, cross-link structure 13 acts to define a peeling interface when casing films 4, 5 are peeled off. Supposing that cross-link structure portion 13 is not formed, if thermo-fusing resin layers 8 of casing films 4, 5 exhibit excessively high sealing strengths to each other, casing films 4, 5 are peeled off progressively while breaking thermo-fusing resin layers 8, and can therefore be peeled off on the interface of thermo-fusing resin layer 8 and non-ventilation layer 9. If they are peeled off progressively on this interface, casing films 4, 5 are peeled off to their end edges, at which time gases are released, without the battery element receiving recess communicating with gas release chamber 12.

Next, a description is given of the principle under which casing films 4, 5 are peeled off on the interface thereof by forming cross-link structure 13 in one of casing films 4, 5.

Generally, when a resin layer which is cross-linked (hereinafter called the "cross-linked resin layer") is thermally fused with a resin layer which is not cross-linked (hereinafter "non-cross-linked resin layer), the following occurs on the sealing interface of the cross-linked resin layer and non-cross-linked resin layer. In the cross-linked resin layer, since cross-linked polymer chains cannot migrate, the polymer chains are unlikely to mutually melt in the non-cross-linked resin layer into integration. However, even in the cross-linked resin layer, polymer chains which are not cross-linked exist in interstices of or inside the matrix of cross-linked polymer chains, depending on its cross-link degree. In a micro portion in which such free polymer chains, not cross-linked, gather together, polymer chains can melt/migrate at temperatures equal to or higher than the melting point.

Therefore, when the micro portion is in contact with a sealing interface with the non-cross-linked resin layer, polymer chains mutually migrate between the respective resin layers through the sealing interface if the cross-linked resin layer and non-cross-linked resin layer which are in contact with each other are heated to temperatures equal to or higher than the melting point. Then, when the respective heated resin layers are cooled down and solidified, an aggregate or a crystalloid, in which polymer chains not cross-linked in the cross-link resin layer are mixed with polymer chains in the cross-link resin layer, can be formed in a continuously integrated state between the respective resin layers through the sealing interface.

As described above, when the cross-link resin layer is thermally fused with the non-cross-linked resin layer, polymer chains which are not cross-linked in the cross-link resin layer contribute to the sealing of both resin layers to each other on the sealing interface, whereas cross-linked polymer chains in the cross-link resin layer are not continuously integrated with the non-cross-linked resin layer. Such a portion which is not continuously integrated exist on the sealing interface of both resin layers, so that when a peel-off stress acts on both resin layers, casing films 4, 5 peel off progressively on the sealing interface of both resin layers, i.e., the interface thereof.

Here, when the cross-link resin layer is changed in cross-link degree, this causes a change in the proportion occupied by the micro portion in which free polymer chains, which are not cross-linked, gather together. As a result, when the cross-link resin layer is thermally fused with the non-cross-link resin layer, this causes a change in the proportion of the aggregate or crystalloid which is continuously integrated between the respective resin layers through the sealing interface. Specifically, as the cross-link degree of the cross-link resin layer is reduced, the proportion occupied by the micro portion becomes higher, leading to a higher proportion of the aggregate or crystalloid which is continuously integrated between the respective resin layers. As the aggregate or crystalloid continuously integrated between the respective resin layers occupies in a higher proportion, each resin layer is increased in sealing strength. Since the cross-link degree of the cross-link resin layer can be controlled by changing the amount of irradiated electron beam, each resin layer can also be freely controlled in sealing strength by controlling the amount of irradiated electron beam.

The sealing strength, stated another way, means a peeling strength. Specifically, as the sealing strength is higher, the resin layer is less likely to peel off, and exhibits a higher peeling strength.

The gas release pressure in this embodiment depends on the peeling strength of casing films 4, 5 in protrusive fused portion 11. The sealing strength depends on the amount of irradiated electron beam when cross-link structure portion 13 is formed, as mentioned above. A larger amount of irradiated electron beam results in a higher cross-link degree of thermo-fusing resin layers 8 which has been irradiated with the electron beam, leading to a tendency of a lower peeling strength of casing films 4, 5 in protrusive fused portion 11. By reducing the peeling strength, the pressure is released at a lower pressure. In other words, the release pressure can be arbitrarily set by adjusting the cross-link degree of thermo-fusing resin layers 8 as appropriate.

In film packed battery 1, a preferable design release pressure is in a range of 0.05 MPa to 1 MPa, and more preferably in a range of 0.1 MPa to 0.2 MPa, as a surplus from the atmospheric pressure. If the release pressure is too low, film packed battery 1 opens even due to minor troubles such as a flow of a temporary large current or a temporary rise in temperature, giving rise to a trouble that film packed battery 1 is inoperative. On the other hand, if the release pressure is too high, the film packed battery will open at another site before the casing films peel off up to gas release chamber 12, causing an increase in risk of gases blowing out in an unintended direction.

Next, tube 14 is described.

In this embodiment, since tube 14 is hermetically connected to gas release chamber 12, gases generated internally to film packed battery 1 can be released at an arbitrary position by appropriately setting the routing and length of tube 14.

For example, when film packed battery 1 is used as an energy source for an electric car, a plurality of film packed batteries 1 are used in combination in order to ensure a voltage and a current required to drive a motor. In this event, since film packed batteries 1 generate heat due to recharges and discharges, cooling air is supplied to a space in which film packed batteries 1 are received to cool down the generated heat. The air utilized for the cooling is often circulated in a cabin for utilization as warm air.

In this event, even if gases are generated due to some abnormally of film packed battery 1 and the generated gases are released from pressure release portion 10, tube 14 is connected to pressure release portion 10, so that the gases can be released to a location at which less influence is exerted by the gases, for example, outside the car, through a path isolated from a cooling air path. Supposing that gases are released from a location other than pressure release portion 10, the released gases will stick to neighboring electric devices and mechanical devices, and will be mixed with the cooling air and introduced into the cabin. Since gases generated from film packed battery 1 can contain a mist of electrolytic solution, it is not preferable that the gases generated from film packed battery 1 stick to a variety of neighboring devices and are introduced into the cabin.

Accordingly, by leading gases generated in film packed battery 1 to an appropriate location through tube 14 as in this embodiment, the foregoing drawbacks are solved. Also, it is often the case that film packed battery 1 is heated to high temperatures when film packed battery 1 is in trouble, so that gases generated therein are also heated to high temperatures. When tube 14 is designed to have a length sufficient to cool down the gases, the generated gases can be cooled down while they flow ahead through tube 14. For facilitating the routing of tube 14, tube 14 is preferably made of a flexible member.

While an example given herein is film packed battery 1 equipped in a car, the present invention is not so limited, but the foregoing applies to a scenario where film packed battery 1 is used within a space in which released gases would cause inconveniences, such as a clean room, a room incapable of ventilation, and the like, in which case gases are preferably discharged to the outside of the space.

While the foregoing description has been given of film packed battery 1 which comprises pressure release portion 10 including protrusive fused portion 11 and cross-link structure portion 13, pressure release portion 10 need not include both of them, but may include one of protrusive fused portion 11 or cross-link structure portion 13.

As described above, protrusive fused portion 11 serves to receive the concentrating stress of peeling off casing films 4, 5, and casing films 4, 5 peel off progressively in protrusive fused portion 11 in preference to the remaining portions of thermally fused region 6. Therefore, when casing films 4, 5 have a sufficiently high adhesive force between non-ventilation layer 9 and thermo-fusing resin layer 8 to eliminate the possibility of inter-layer peeling, or are not laminate films, casing films 4, 5 can be comprised only of protrusive fused portion 11 without providing cross-link structure portion 13.

On the other hand, cross-link structure portion 13 is a region less susceptible to softening at high temperatures as compared with other regions, and as a result, a region formed with cross-link structure portion 13 itself exhibits a smaller peeling strength, as compared with other regions. Therefore, when a peeling position can be sufficiently defined only by forming cross-link structure portion 13, cross-link structure portion 13 can be formed in part of thermally fused region 6 without providing protrusive fused portion 11.

Figure 4:
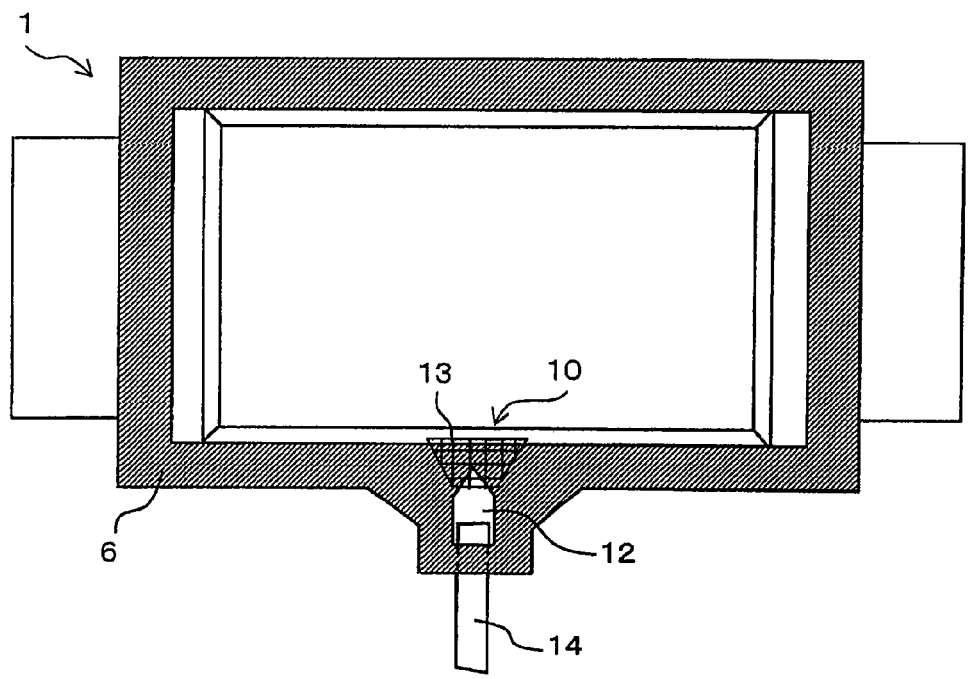
FIG. 4 A plan view illustrating an exemplary modification to the film packed battery illustrated in FIG. 1 when it is not provided with a protruding fusion portion.

FIG. 4 illustrates a plan view of an exemplary film packed battery which is not provided with the protrusive fused portion. In FIG. 4, the same components as those in FIG. 1 and the like are designated the same reference numerals. This applies to subsequent figures as well.

In film packed battery 1 illustrated in FIG. 4, thermally fused region 6 is formed such that its inner edge is in a rectangular shape. Pressure release portion 10 is provided in part of thermally fused region 6. Pressure release portion 10 includes cross-link structure portion 13 formed at a position straddling a battery element receiving recess and gas release chamber 12. Cross-link structure portion 13 is formed in one of two casing films which seal a battery element (not shown) by partially cross-linking a thermo-fusing resin layer. Then, tube 14 is hermetically connected to gas release chamber 12, with its leading end routed to a location at which no problem will arise even if gases generated within film packed battery 1 are released.

In this way, even in a structure which does not have the protrusive fused portion, the region formed with cross-link structure portion 13 exhibits a lower peeling strength as compared with the remaining regions of thermally fused region 6, so that the casing films peel off in association with an increase in the inner pressure of film packed battery 1 preferentially in the region formed with cross-link structure portion 13. Then, generated gases are released through tube 14 when the casing films have peeled off up to gas release chamber 12.

Cross-link structure portion 13 is not particularly limited in shape or size as long as it has a shape and a size to straddle the battery element receiving recess and gas release chamber 12. For example, in FIG. 2, cross-link structure portion 13 is formed in conformity to the shape of protrusive fused portion 11. On the other hand, in the example illustrated in FIG. 4, cross-link structure portion 13 is formed in the shape of a trapezoid which has the length of the inner edge longer than the length of the outer edge in the longitudinal direction of a side which is provided with pressure release portion 10. By shaping cross-link structure portion 13 in such a manner, cross-link structure portion 13 has a shape conforming to the progress of the peeling of the casing films, thus making it possible to allow the casing films to smoothly peel off.

Figure 5:
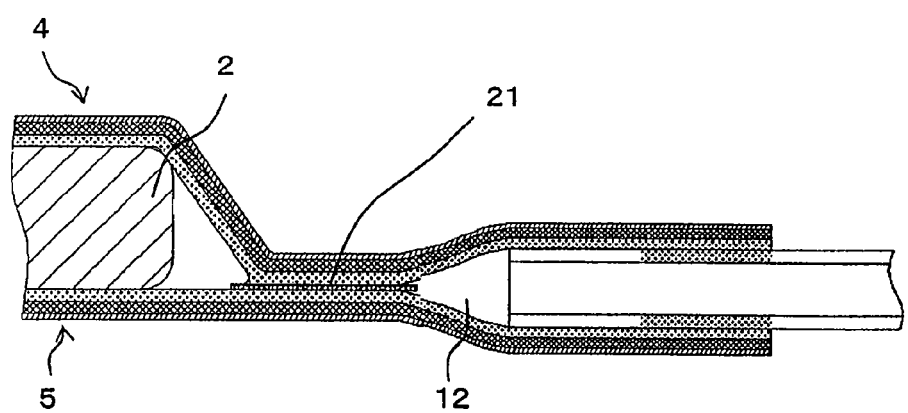
FIG. 5 A cross-sectional view of a main portion along an axial direction of a tube, illustrating another exemplary modification to the film packed battery illustrated in FIG. 1, where a cross-link structure portion is made up of a resin sheet.

The cross-link structure portion need not be formed in the casing film itself. For example, as illustrated in FIG. 5, previously cross-linked resin sheet 21 may be sandwiched between opposing casing films 4, 5 to form the cross-link structure portion. Resin sheet 21 has been previously thermally fused to one of casing films 4, 5 before casing films 4, 5 are thermally fused to each other. According to this configuration, when the inner pressure increases to peel off the thermally fused region, the peeling progresses on the interface between one casing film 4 and resin sheet 21 or on the interface between the other casing film 5 and resin sheet 21. In any case, the casing films peel off in a region in which resin sheet 21 intervenes, in preference to the remaining regions, causing the battery element receiving recess which receives battery element 2 to communicate with gas release chamber 12.

Resins available for comprising resin sheet 21 can be those resins exemplified above as resins available for comprising the thermo-fusing resin layers of casing films 4, 5. Among others, the same kind of resin as thermo-fusing resin layers 8 of casing films 4, 5 is preferably used in order to ensure a sealing strength minimally required to seal battery element 2. The shape, size and the like of resin sheet 21 are arbitrary as long as one site exposes to the battery element receiving recess, while another site exposes to gas release chamber 12.

Resin sheet 21 may be in the form of film or mesh. When in the form of mesh, thermo-fusing resin layer 8 melted by thermally fusing impregnates into meshes of resin sheet 21 to produce an anchor effect, potentially ensuring a required sealing strength. Of course, irrespective of the form of resin sheet 21, the sealing strength with casing films 4, 5 can be arbitrarily controlled by adjusting the cross-link degree of resin sheet 21 as appropriate.

In this way, similar effects to those of the aforementioned respective examples can be produced as well when the cross-link structure portion is formed of resin sheet 21. Particularly, since the cross-link structure portion is implemented by resin sheet 21 which is thermally fused to one of casing films 4, 5, a distinction can be visually made as to whether or not the cross-link structure portion is included, thus facilitating the management of parts during manufacturing steps. In addition, materials for casing films 4, 5 (particularly, thermo-fusing resin layer 8) can be selected from a larger number of options.

While the description has been so far given on the assumption that the cross-link structure portion is formed in one of opposing casing films 4, 5, the cross-link structure portions may be formed in both casing films 4, 5, provided that a sufficient adhesive force can be produced to seal battery element 2. In this event, respective casing films 4, 5 may be irradiated with an equal amount or different amounts of electron beam. When this is applied to the configuration illustrated in FIG. 5, cross-linked resin sheets 21 are thermally fused to casing films 4, 5, respectively.

Figure 6:
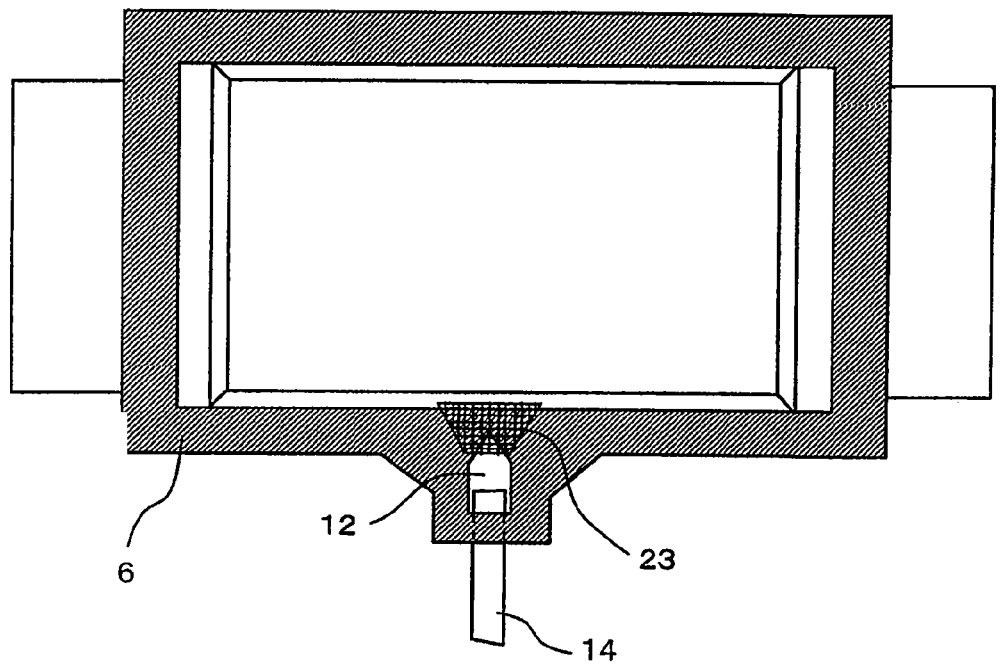
FIG. 6 A plan view illustrating a further exemplary modification to the film packed battery illustrated in FIG. 1, which has a pressure release portion including an unwoven fabric.

FIG. 6 illustrates a further exemplary modification to the first embodiment of the present invention. The example illustrated in FIG. 6 substitutes unwoven fabric 23 for resin sheet 21 shown in FIG. 5 to comprise the pressure release portion. Specifically, in part of thermally fused region 6, unwoven fabric 23 is sandwiched between opposing casing films such that one site thereof exposes to a battery element receiving recess, while another site thereof exposes to gas release chamber 12. Unwoven fabric 23 is made of a different type of resin from the thermo-fusing resin layer of the casing films, which has a melting point higher than the melting point of the thermo-fusing resin which comprises the thermo-fusing resin layers of the casing films. For example, when the thermo-fusing resin layers of the casing films are made of polypropylene, unwoven fabric 23 can be made of polyethylene telephthalate.

The casing films are thermally fused to each other at temperatures higher than the melting point of the thermo-fusing resin which comprises the thermo-fusing resin layers of the casing films and lower than the melting point of the resin which comprises unwoven fabric 23. In this way, fibers of unwoven fabric 23 do not melt whereas the thermo-fusing resin layers melt, so that the thermo-fusing resin of the thermo-fusing resin layers impregnates among fibers of unwoven fabric 23. Consequently, unwoven fabric 23 is held in the thermo-fusing resin layers of the two casing films, which have been integrated by the thermally fusing.

The structure which has unwoven fabric 23 sandwiched between the opposing casing films can be fabricated, for example, in the following manner. First, unwoven fabric 23 which has been previously cut in predetermined dimensions is carried on a portion of one of two casing films, which later serves as thermally fused region 6, and unwoven fabric 23 is preliminarily fixed to the casing film by an adhesive or thermally fusing at low temperatures at which the thermo-fusing resin layers slightly soften, or the like. This preliminary fixation need not firmly fix unwoven fabric 23 to the casing film, but may be to such an extent that unwoven fabric 23 can be held on the casing film until thermally fused region 6 has been eventually formed. Subsequently, a battery element (not shown) is sealed by thermally fusing the casing films, and tube 14 is connected in a manner similar to the aforementioned example.

The film packed battery thus produced includes unwoven fabric 23 sandwiched in part of thermally fused region 6, and in this portion in which unwoven fabric 23 is sandwiched, the thermo-fusing resin which comprises the thermo-fusing resin layers of the casing films impregnates among fibers of unwoven fabric 23. For this reason, since the thermo-fusing resin is not divided in the thickness direction of the thermo-fusing resin layers, it is possible to achieve sealing performance required for thermally fused region 6.

Further, by sandwiching unwoven fabric 23, in the region including sandwiched unwoven fabric 23, a region in which the thermo-fusing resin layers of the casing films are adhered to each other, i.e., the area of a portion of the thermo-fusing resin continuously connecting in the thickness direction of the thermo-fusing resin layers, is smaller, as compared with a remaining region having the same area in which unwoven fabric 23 is not sandwiched. Since unwoven fabric 23 is made of a resin having a higher melting point of a type different from the thermo-fusing resin which comprises the thermo-fusing resin layers, the adhesive strength of the resin which comprises unwoven fabric 23 to the thermo-fusing resin is lower than the adhesive strength of the thermo-fusing resin layers to each other.

From this fact, the casing films can be peeled off in the portion in which unwoven fabric 23 is sandwiched with a smaller peel-off stress, as compared with the remaining thermally fused region 6. Accordingly, as a peel-off force acts on thermally fused region 6 due to an increase in the inner pressure, the casing films peel off preferentially in the portion in which unwoven fabric 23 is sandwiched in the thermally fused region 6. As the casing films peel off up to gas release chamber 12, the battery element receiving recess communicates with gas release chamber 12, thus releasing the increased pressure through tube 14. Thus, gases generated within the film packed battery can be safely released from the leading end of tube 14.

The peeling strength of the casing films in the portion in which unwoven fabric 23 is sandwiched depends on the proportion in which the thermo-fusing resin exists within the thermo-fusing resin layers. There is a tendency that a higher existing proportion results in a higher peeling strength, while a lower existing proportion results in a lower peeling strength. The proportion in which the thermo-fusing resin exists in the thermo-fusing resin layers depends on the fiber areal weight of sandwiched unwoven fabric 23. There is a tendency that a larger fiber areal weight results in a lower existing proportion of the thermo-fusing resin, while a smaller fiber areal weight results in a higher existing proportion of the thermo-fusing resin. From the foregoing, by appropriately setting the fiber areal weight of sandwiched unwoven fabric 23, the peeling strength can be adjusted in the region in which unwoven fabric 23 is sandwiched. In this way, with the structure for adjusting the peeling strength by sandwiching unwoven fabric 23, the gas release pressure can be arbitrarily set by appropriately setting the fiber areal weight of unwoven fabric 23.

Sandwiched unwoven fabric 23 used herein may be any of wet type, dry type (resin adhesion, thermal bond, spun lace), and spun bond type (melted fiber spinning, wet fiber spinning, flash fiber spinning, melt blow). Also, while unwoven fabrics 23 include one which has fibers aligned substantially in one direction, and one which has fibers arranged at random, the adjustment of the peeling strength is largely related to the proportion of fibers which occupy in the thermo-fusing resin layers, whereas great importance is not placed on whether or not fibers are aligned, or on the direction in which fibers are arranged. Accordingly, unwoven fabric 23 can be used irrespective of whether fibers are aligned or not. Even when used unwoven fabric 23 has aligned fibers, the fibers may be aligned in whichever direction. Also, the aforementioned formation of the cross-link structure portion can be applied to the shape and size of unwoven fabric 23. Further, a protrusive fused portion as shown in FIG. 1 can be formed in part of thermally fused region 6, and unwoven fabric 23 can be disposed in a region including this protrusive fused portion. The protrusive fused portion acts as previously described.

Figure 7:
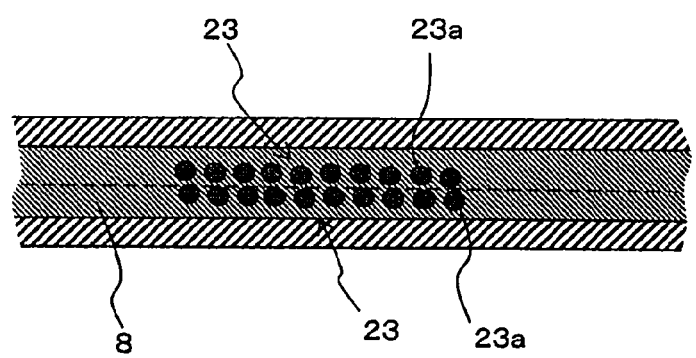
FIG. 7 A cross-sectional view of a pressure release portion which has two-ply unwoven fabric.

For reducing the release pressure, the fiber areal weight of sandwiched unwoven fabric 23 may be increased, as previously described. However, the reduction in the release pressure is limited if single unwoven fabric 23 alone is relied on. Also, unwoven fabric 23 generally increases in thickness as well in accordance with the fiber areal weight, so that if unwoven fabric 23 is excessively increased in thickness in order to achieve a desired fiber areal weight, the thermo-fusing resin does not sufficiently impregnate among fibers of unwoven fabric 23, possibly compromising the reliability of sealing. Accordingly, when a lower release pressure is required, two unwoven fabric 23 are preferably sandwiched in stack, as illustrated in FIG. 7. FIG. 7 illustrates a portion of the thermally fused region in which unwoven fabrics 23 are sandwiched in a cross-sectional view taken in the direction along the outer edge of the casing films. Also, unwoven fabric 23 used herein has fibers 23a aligned in one direction, and unwoven fabric 23 is arranged such that the direction of the alignment is at right angles to the outer edges of the casing films. Accordingly, FIG. 7 illustrates unwoven fabric 23 in cross section of fibers 23a. Likewise, when two unwoven fabrics 23 are stacked, unwoven fabrics 23 are likewise held within thermo-fusing resin layers 8 of the casing films which have been integrated by the thermally fusing.

By stacking two unwoven fabrics 23, the peeling strength can be reduced more than when single unwoven fabric 23 is sandwiched, which has the same fiber areal weight as a total of fiber areal weights of two unwoven fabrics 23. Presumably, this is because, by stacking two unwoven fabrics 23, the thermo-fusing resins impregnating into respective unwoven fabrics 23 connect in a smaller region on the boundary of two unwoven fabrics 23, so that the thermo-fusing resins connect to each other in a smaller region, as compared with single unwoven fabric 23. The number of stacked unwoven fabrics 23 is not limited to two, but may be three or more if an even lower release pressure is required.

While the configuration shown herein comprises a member impregnated with the thermo-fusing resin and sandwiched between casing films 4, 5, the sandwiched laminar member is not limited to the unwoven fabric as long as the member is made of a resin having a melting point higher than the thermo-fusing resin which comprises thermo-fusing resin layers 8 of casing films 4, 5, and has a structure which allows the melted thermo-fusing resin to impregnate thereinto. Such laminar members may be a fiber aggregate, a micro-porous film, a resin sheet and the like, so that similar effects to the foregoing can be produced as well when the aforementioned structure is replaced with a fiber aggregate, a micro-porous film, a resin sheet or the like.

A fiber aggregate comprises a multiplicity of fibers which are configured to allow a thermo-fusing resin to impregnate among the fibers, and includes a woven fabric made by horizontally and vertically weaving fibers, in addition to the aforementioned unwoven fabric. Likewise, in a woven fabric, the release pressure can be arbitrarily set by appropriately setting the fiber areal weight. A micro-porous film is a film formed with a multiplicity of pores in dispersion. When the micro-porous film is used as a laminar member, the thermo-fusing resin impregnates into these micro-pores. The micro-porous film used for this purpose can be made of the same material as that used for the separators as long as it has a higher melting point than that of the thermo-fusing resin which comprises the thermally fused layers of the casing films. When the micro-porous film is used, the release pressure can be controlled by appropriately setting the size and distribution density of the micro-pores. The size and distribution density of the micro-pores depend on a draw ratio of the film when the micro-porous film is produced by a dry process, and depends on the diameter and content of solvent and micro-pores when it is manufactured by a wet process. Like the micro-porous film, the resin sheet is also formed by distributing a multiplicity of openings into which a melted thermo-fusing resin impregnates, and can control the release pressure by an aperture ratio. It should be noted that in the present invention, the resin sheet is distinguished from the micro-porous film from a viewpoint that it has a larger thickness than the micro-porous film. A resin sheet into which the melted thermo-fusing resin can impregnate can be fabricated by forming a sheet raw fabric formed, for example, by a T-die method, with a multiplicity of openings through punching or with hot needles or the like. Advantageously, when a resin sheet is used as the laminar member, the aperture ratio can be arbitrarily set by freely setting the size, arrangement and the like of the openings.

While the first embodiment of the present invention has been described giving an example in which a tube is used for the gas guide portion, the gas guide portion may be implemented by a laminate film which comprises the casing film. In this event, the casing film is preferably shaped to have an elongated portion extending to a position spaced away from the battery element, which serves as a passage for leading gases.

Second Embodiment

Figure 8:
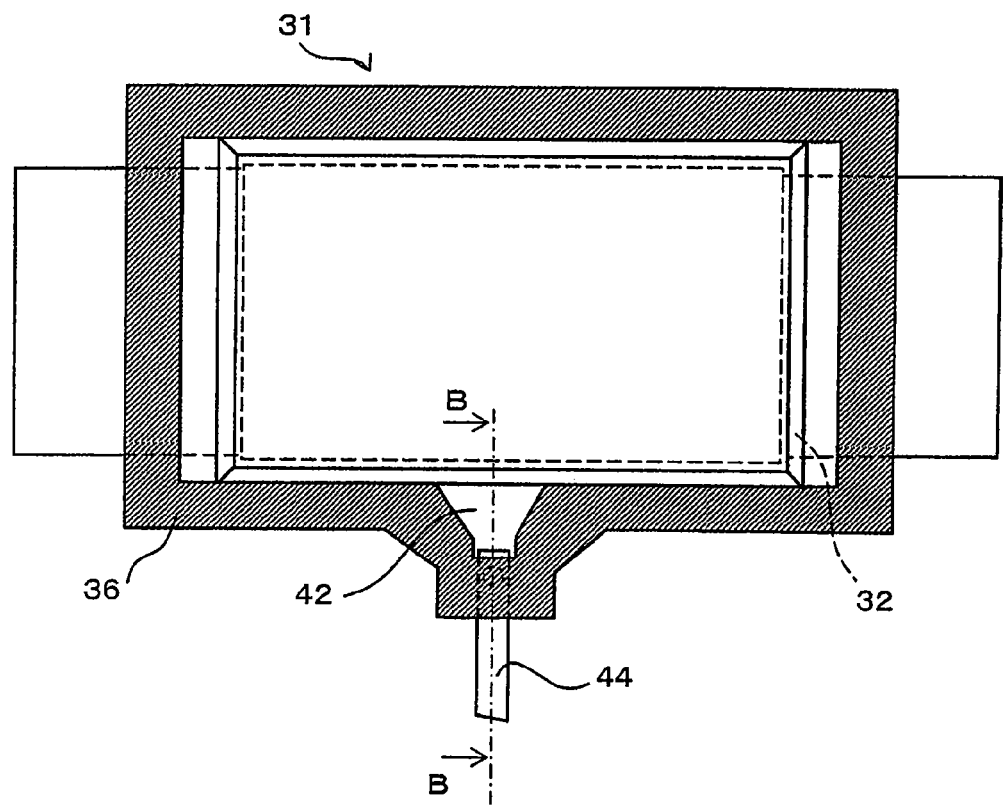
FIG. 8 A plan view of a film packed battery according to a second embodiment of the present invention.
Figure 9:
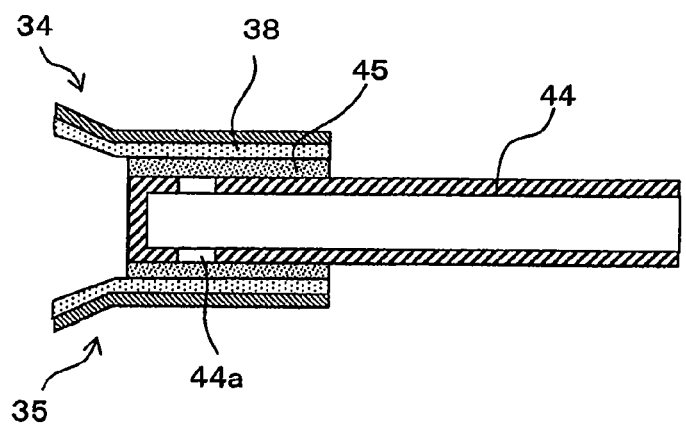
FIG. 9 A cross-sectional view taken along B-B line in FIG. 8.

Referring to FIGS. 8 and 9, in film packed battery 31 of this embodiment, tube 44 has a function as a pressure release portion as well as a function as a gas guide portion. Tube 44 is a metal pile, one end of which is closed, and the other end of which is opened. At the closed end of tube 44, throughhole 44a is formed through side surfaces of tube 44. The number of throughhole 44a may be one or plural.

Casing films 34, 35 used herein may be laminate films similar to those used in the first embodiment, where battery element 32 is sealed by placing thermo-fusing resin layers 38 in opposition to each other, sandwiching battery element 32 therebetween, and thermally fusing casing films 34, 35 around battery element 32. Inside of thermally fused region 36 formed over the overall periphery of film packed battery 31 by thermally fusing casing films 34, 35, gas reservoir 42, which includes a non-thermally fused portions of casing films 34, 35, is provided extending from a battery element receiving recess for receiving battery element 32. Tube 44 exposes a closed end surface to the interior of gas reservoir 42 such that throughhole 44a is enclosed from the outside of tube 44, and is sandwiched between and fixed by casing films 34, 35 through metal adhesive resin 45 in thermally fused region 36.

Metal adhesive resin 45 is a resin which can be thermally fused to a metal, and a modified resin is given as an example. By interposing metal adhesive resin 45 between tube 44 and casing films 34, 35, metal tube 44 can be thermally fused to casing films 34, 35. In order to allow casing films 34, 35 to be satisfactorily thermally fused to tube 44, metal adhesive resin 45 is preferably a resin of the same type as thermo-fusing resin layer 38. When thermo-fusing resin layer 38 is made of polypropylene, modified polypropylene is preferably used for metal adhesive resin 45.

Metal adhesive resin 35 is disposed over the overall periphery of tube 44 at least at a position at which throughhole 44a is closed in an axial direction of tube 44. Tube 44 is thermally fused to casing films 34, 35 through this metal adhesive resin 45, thereby hermetically connecting tube 44 to casing films 34, 35.

Since the remaining configuration is similar to the first embodiment, descriptions on these are omitted.

According to film packed battery 31 of this embodiment, when gases are generated inside due to some abnormality to increase the inner pressure, the battery element receiving recess and gas reservoir 42 inflate, causing a stress of peeling off casing films 34, 35 to act on the inner edge of thermally fused region 36. An interface on which the casing films peel off by the action of the peel-off stress may include, other than the interface between thermo-fusing resin layers 38 of casing films 34, 35, the interface between thermo-fusing resin layers 38 of casing films 34, 35 and metal adhesive resin 45, and the interface between metal adhesive resin 45 and tube 44, particularly in a region in which tube 44 is thermally fused. Among these interfaces, layers are more likely to peel off on an interface between a resin and a metal than an interface between a resin and a resin.

Figure 10:
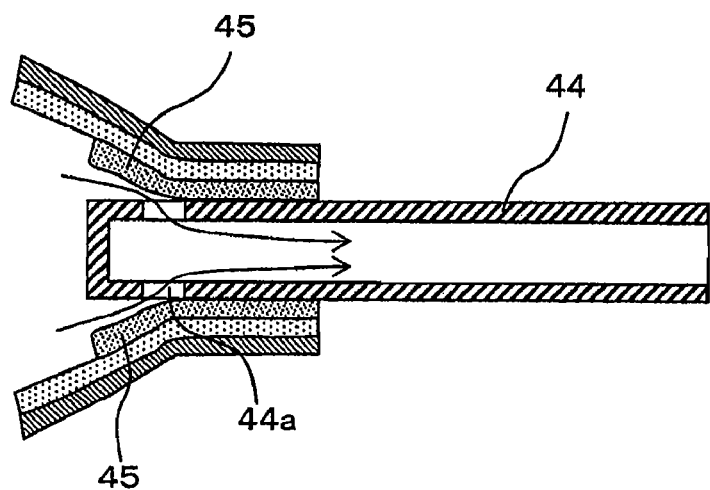
FIG. 10 A cross-sectional view taken along B-B line of the film packed battery illustrated in FIG. 8, when the pressure is released.

Therefore, the peeling associated with an increase in the inner pressure progresses on the interface between tube 44 and metal adhesive resin 45. When the peeling reaches throughhole 44a, throughhole 44a opens, so that gases generated within film packed battery 31 is introduced from throughhole 44a into tube 44, and released through tube 44, as illustrated in FIG. 10. In other words, tube 14 functions as a pressure release portion from the closed end to a portion through which throughhole 44a is formed. After throughhole 4a opens, the inner pressure is released, and no peel-off stress acts on the interface between tube 44 and metal adhesive resin 45, so that the peeling no longer progresses. Thus, the sealability is maintained at the connection of tube 44 with casing films 34, 35, and gases are reliably released from the leading end of tube 44 without leaking from end surfaces of casing films 34, 35.

According to the configuration of this embodiment, the gas release pressure can be arbitrarily set by appropriately setting the position of throughhole 44a in a region in which tube 44 is thermally fused in the direction in which the peeling progresses. The position of throughhole 44a can also be adjusted by the position at which tube 44 is attached, or can be adjusted by the position at which throughhole 44a is formed through tube 44.

Tube 44 can be made of a resin as well. In this event, in order that the peeling progresses on the outer peripheral surface of tube 44 without fail, a different type of resin from thermo-fusing resin layers 38 of casing films 34, 35 is used for tube 44. Also, in this event, metal adhesive resin 45 is not needed, but tube 44 can be directly thermally fused to casing films 34, 35. Tube 44 can be made in any arbitrary cross-sectional shape such as a circular shape, a rectangular shape and the like, as long as it can be hermetically connected between casing films 34, 35. Also, tube 44 is not particularly limited in form as long as it is a tubular member with one closed end, and is formed with a throughhole through side walls thereof in a region which is directly or indirectly thermally fused to casing films 34, 35.

In this embodiment, tube 44 exposes to the space in which battery element 32 is received. For this reason, when tube 44 is made of a resin, moisture within the air can introduce into the battery element receiving recess through the wall surface of tube 44. The introduction of moisture into the battery element receiving recess adversely affects the performance of film packed battery 31. Speaking from this point of view, tube 44 is most preferably made of a metal, and at least a portion exposing to the space for receiving the battery element is made of a metal.

Also, in this embodiment, when casing films 34, 35 have been previously processed in conformity to the shape of gas reservoir 42 and the outside shape of tube 44 in a portion to which tube 44 is connected, not only the cut portion for forming the battery element receiving recess, in a manner similar to the first embodiment, tube 44 can be more reliably hermetically connected.

While the present invention has been described above giving several representative examples, it is apparent that the present invention is not limited to them, but can be modified as appropriate within the technical idea of the present invention.

For example, each of the foregoing embodiments has shown an example in which a tube is used for the gas guide portion, where the tube is simply connected directly or indirectly to the casing films, but a member for urging the casing films toward the tube from the outside thereof may be added to the connection of the casing films with the tube to reinforce the hermetic connectivity of the casing films with the tube. As an example of such a member, there is protective member 66 as illustrated in FIG. 11.

Figure 11:
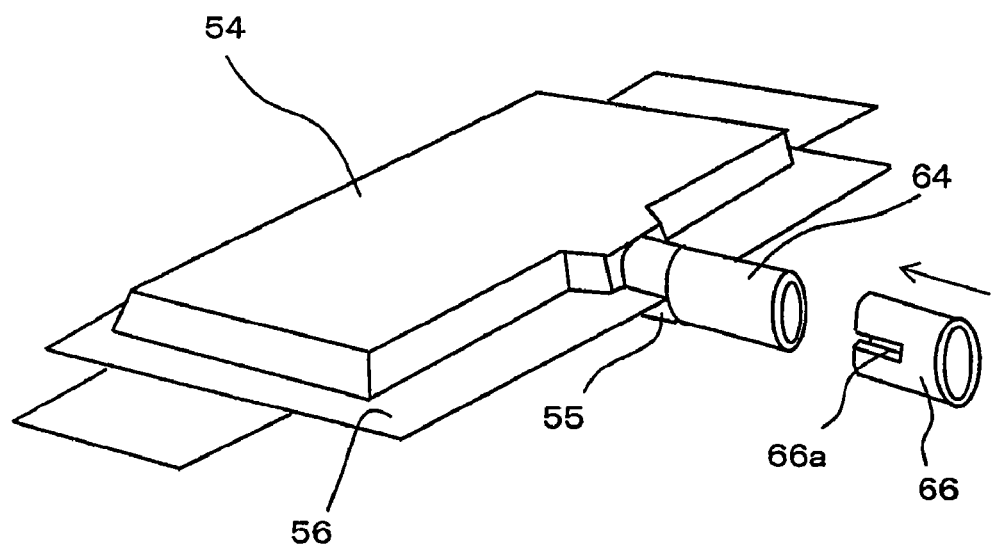
FIG. 11 A perspective view of an example of the film packed battery according to the present invention which has a reinforced connection of a casing film with a tube.

Protective member 66 illustrated in FIG. 11 is a cylindrical member which is covered on a connection of casing films 54, 55 with tube 64. Protective member 66 is formed with a notch 66a in a side surface thereof for escape of thermally fused region 56.

Generally, in an abnormal event in which the inner pressure increases to such an extent that the pressure release portion acts, the film packed battery can be heated to high temperatures. Therefore, the inner pressure increases also in a portion which serves as a gas passage when the pressure is released, and this portion can be heated to high temperatures in some cases. In the embodiments described above, flexible casing films 54, 55 are sealed to the outer peripheral surface of tube 64 to connect tube 64 to casing films 54, 55, so that an increase in the inner pressure results in a force which acts on the connection with tube 64 to open casing films 54, 55 outward. When the inner pressure increases as mentioned above to grow this force, there is assumed apprehension that casing films 54, 55 peel off from tube 64. On top of that, if a high temperature is added, the thermo-fusing resin layers of the casing films will soften or melt, making casing films 54, 55 more susceptible to peel off. The peeling of casing films 54, 55 can lead to the formation of a gas leak path and to detachment of tube 64.

Accordingly, protective member 66 is provided to make casing films 54, 55 less susceptible to peel off at the connection of casing films 54, 55 with tube 64 when the pressure is released, thereby making it possible to prevent gases from leaking from the connection of casing films 54, 55 with tube 64, to release the gases from the leading end of tube 64. A material for such protective member 66 is preferably a metal, a heat-resistant resin, or the like.

Figure 12:
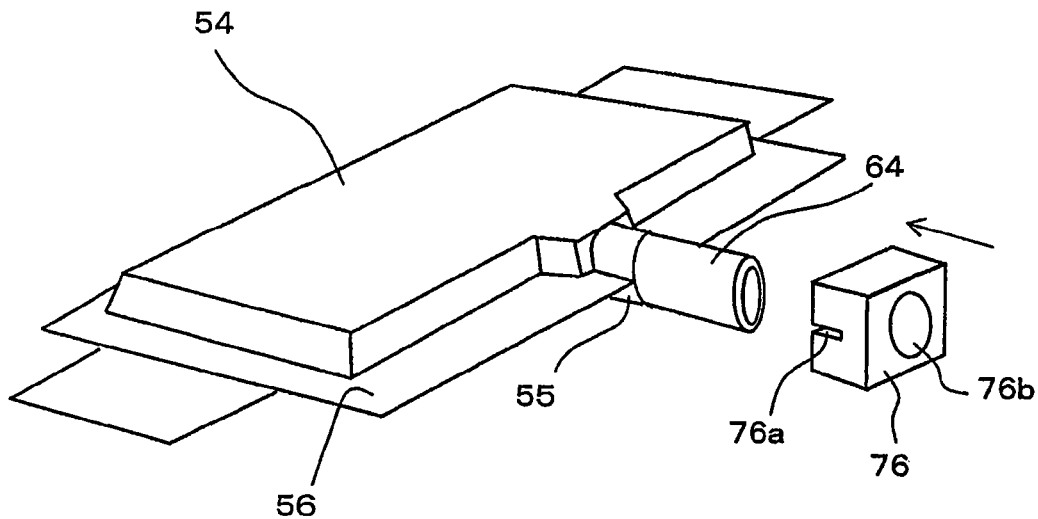
FIG. 12 A perspective view of another example of the film packed battery according to the present invention which has a reinforced connection of the casing film with the tube.
Figure 13:
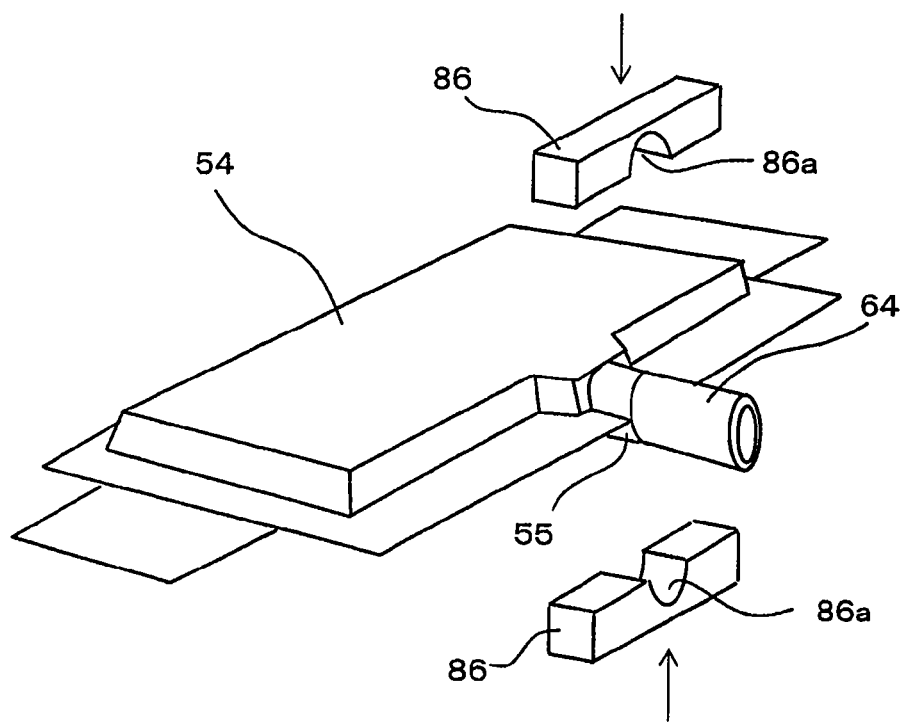
FIG. 13 A perspective view of a further example of the film packed battery according to the present invention which has a reinforced connection of the casing film with the tube.

The member for urging casing films 54, 55 toward tube 64 at the connection of casing films 54, 55 with tube 64 need not be cylindrical. For example, it may be block-shaped member 76 as illustrated in FIG. 12, or may be a pair of members 86 which sandwich casing films 54, 55 from their opposing directions. In the example illustrated in FIG. 12, block-shaped member 76 comprises throughhole 76b for passing tube 64 therethrough, and a notch 76a for escape of thermally fused region 56. In the example illustrated in FIG. 13, recess 86a corresponding to the outside shape of tube 64 is formed respectively in a portion of each member 86 corresponding to tube 64.

On the other hand, as means for improving the sealability at the connection of the tube when the pressure is released, this can be achieved by modifying the properties of the casing films themselves in addition to the provision of the protective member. One example is the aforementioned cross-linking of a resin through the irradiation of electron beam. The cross-link structure portion formed by the cross-linking is characteristically less prone to softening at high temperatures as compared with a resin not cross-linked, as has been previously stated. Taking advantage of this fact, the connection of the casing films with the tube can be cross-linked to make the thermo-fusing resin layers of the casing films in this portion hard to soften even at high temperatures, thereby preventing gases from leaking from the connection of the casing films with the tube.

This cross-linking is performed after the casing films are thermally fused with the tube. Particularly, when the material of the outer peripheral surface of at least a portion of the tube bonded to the casing films is made of the same type of resin as the resin which comprises the thermo-fusing resin layer of the casing films, not only the thermo-fusing resin layers but also the outer peripheral surface of the tube are cross-linked in the joint of the tube with the casing films, with the tube integrated with the casing film, by the cross-linking after thermally fusing the casing film with the tube, so that it is preferable for ensuring the hermetic connectivity at high temperatures.

The cross-linking for forming the pressure release portion having a cross-link structure portion, as described in the first embodiment, is performed before the casing films are thermally fused, so that in this respect, this cross-linking is different from the cross-linking for ensuring the hermetic connectivity of the tube. The cross-linking performed after the casing films are thermally fused with the tube may be performed not only for the connection of the casing films with the tube but also for the entirety of the remaining thermally fused region and further for the overall casing films. However, if a region which later serves as the pressure release portion is cross-linked, the peeling strength of the casing films can vary, i.e., the release pressure can vary, so that the region which later serves as the pressure release portion is preferably not cross-linked. Also, by cross-linking the entirety of the remaining thermally fused region, the sealability can be improved not only in the connection of the casing films with the tube but also in the remaining thermally fused region.

Also, in regard to the structure of the battery element, the foregoing examples have shown a laminate type in which a plurality of positive poles and a plurality of negative poles are alternately laminated one on another. Alternatively, the battery element may be a winding type which has alternately arranged positive poles and negative poles by forming the positive poles, negative poles, and separators in strip shapes, stacking the positive poles and negative poles with the separators interposed therebetween, winding the resulting stack, and compressing the same into a flat shape.

As the battery element, an arbitrary battery element for use in an ordinary battery can be applied as long as it includes a positive pole and a negative pole which oppose across electrolyte. A battery element in a general lithium ion secondary battery comprises a positive plate coated with a positive pole active material such as lithium manganese composite oxide, lithium cobaltate or the like on both surfaces such as aluminum foil or the like, and a positive plate coated with a lithium dopable/undopable carbon material on both surfaces such as a copper foil or the like, where the positive plate opposes the negative plate by way of a separator which is impregnated with an electrolytic solution which contains lithium salt. In addition, as the battery element, there are battery elements of other types of chemical batteries such as a nickel hydrogen battery, a nickel cadmium battery, a lithium metal primary battery or secondary battery, a lithium polymer battery, and the like. Further, the present invention can also be applied to an electric device, sealed by casing films, which internally accumulates electric energy and can generate gases through chemical reactions or physical reactions, such as a capacitor element exemplified by a capacitor such as an electric double layered capacitor, an electrolytic capacitor, and the like.

The invention claimed is:

1. A film-covered electric device comprising:
    an electric device element which internally accumulates electric energy and is capable of generating a gas through a chemical reaction or a physical reaction;
    casing films each including a thermo-fusing resin layer, for surrounding said electric device element such that said thermo-fusing resin layers oppose each other along the periphery of said electric device element to seal said electric device element by a thermally fused region formed by thermally fusing said thermo-fusing resin layers opposing along the periphery to each other around the overall periphery of said electric device element;
    a gas guide portion including a hollow portion independent of a space in which said electric device element is received, for leading the gas to a position spaced away from said electric device element, said gas guide portion communicating with external air; and
    a pressure release portion formed in part of said thermally fused region by connecting the space in which said electric device element is received to said hollow portion, for peeling off in preference to another region of said thermally fused region to allow the gas to pass therethrough,
    wherein said gas guide portion comprises a gas release chamber formed in said thermally fused region as part of the hollow portion, and a tube which is opened at both ends, sandwiched by said casing films and connected to said gas release chamber.

2. The film-covered electric device according to claim 1, wherein said tube is bonded to said casing films through thermally fusing, and at least an outer peripheral surface of a joint with said casing films is made of a resin of the same type as a resin which comprises said thermo-fusing resin layers.

3. The film-covered electric device according to claim 2, wherein at least a region of said thermally fused region to which said tube is bonded is cross-linked after said casing films are bonded to said tube.

4. The film-covered electric device according to claim 1, wherein said pressure release portion comprises a cross-link structure portion made of a cross-linked resin.

5. The film-covered electric device according to claim 1, comprising a member for urging said casing films to said tube at a connection of said casing films with said tube.

6. The film-covered electric device according to claim 1, wherein said pressure release portion comprises a protrusive fused portion formed by extending part of said thermally fused region toward the space in which said electric device element is received.

7. The filmed packed electric device according to claim 6, wherein said casing films are formed with said thermally fused region having an cove portion which forms an cove with respect to the space in which said electric device element is received, and said protrusive fused portion is positioned in said cove portion.

8. The film-covered electric device according to claim 1, wherein a tube having one closed end and formed with a throughhole through side surfaces thereof exposes the one closed end to the space in which said electric device element is received, between said casing films opposing each other, closes said throughhole from the outside, and is thermally fused with a smaller peeling strength as compared with other regions of said thermally fused region, thereby causing said tube to serve as said gas guide portion comprising said hollow portion and said pressure release portion.

9. The film-covered electric device according to claim 8, wherein said tube is made of a metal at least in a portion exposing to the space in which said electric device element is received.

10. The film-covered electric device according to claim 9, wherein said tube is made of a metal, and said tube and said casing films are thermally fused through a metal adhesive resin.

11. The film-covered electric device according to claim 10, wherein said metal adhesive resin is a modified resin of the same type as the resin which comprises the thermo-fusing resin layers of said casing films.

12. A method of manufacturing a film-covered electric device comprising the steps of:
providing an electric device element which internally accumulates electric energy and is capable of generating a gas through a chemical reaction or a physical reaction, and casing films each including a thermo-fusing resin layer, for sealing said electric device element;
surrounding said electric device element such that said thermo-fusing resin layers oppose each other along the periphery of said electric device element; and
sealing said electric device element by thermally fusing said casing films surrounding said electric device element along the overall periphery of said electric device element, said film-covered electric device comprising a gas guide portion including a hollow portion independent of a space in which said electric device element is received, for leading the gas to a position spaced away from said electric device element, said gas guide portion communicating with external air, and a pressure release portion for connecting said space to said hollow portion in part of said thermally fused region, allowing said casing films to peel off in preference to another region of said thermally fused region to pass the gas therethrough,
wherein said step of sealing said electric device element includes the step of:
forming a gas release chamber as part of said hollow portion by thermally fusing said casing films, and connecting a tube having both open ends to said gas release chamber, while sandwiched by said casing films.

13. The method of manufacturing a film-covered electric device according to claim 12, wherein said step of providing casing films includes the step of:
forming a cross-link structure portion made of a cross-linked resin in a region including a region which later serves as said pressure release portion in at least one of mutually opposing surfaces of said casing films when said electric device element is surrounded.

14. The method of manufacturing a film-covered electric device according to claim 12, wherein said step of sealing said electric device element includes forming said pressure release portion by said thermally fusing to have a protrusive fused portion protruding toward the space in which said electric device element is received.

15. The method of manufacturing a film-covered electric device according to claim 12, wherein said step of sealing said electric device element includes cross-linking a region including at least regions of said casing films to which said tube is connected, after said casing films are thermally fused.

* * * * *